P. G. JACOBSON.
HANDLE STRUCTURE.
APPLICATION FILED AUG. 27, 1914.
1,156,601. Patented Oct. 12, 1915.
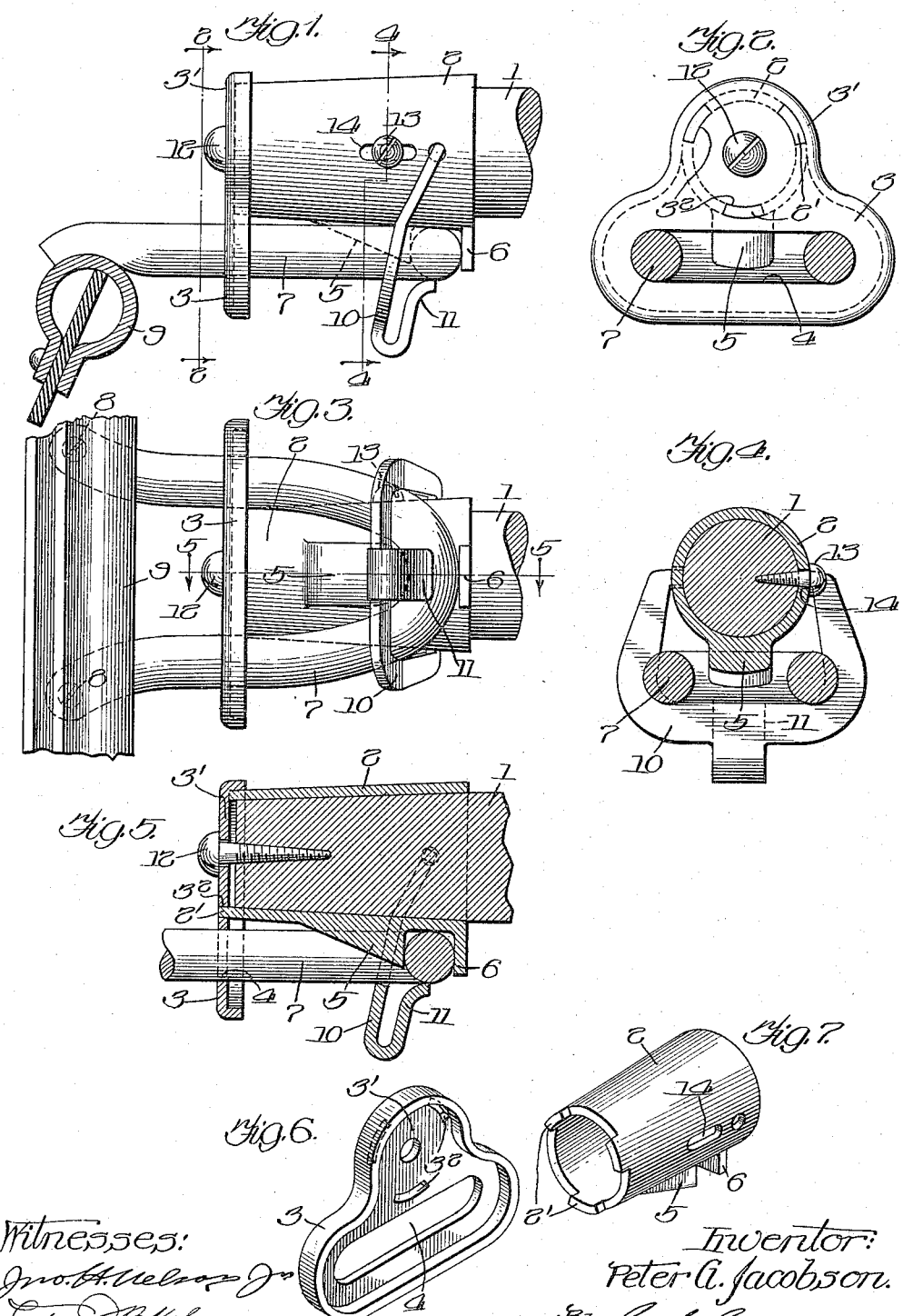
Witnesses:
Inventor:
Peter G. Jacobson.

UNITED STATES PATENT OFFICE.

PETER G. JACOBSON, OF CHICAGO, ILLINOIS.

HANDLE STRUCTURE.

1,156,601.
Specification of Letters Patent.
Patented Oct. 12, 1915.

Application filed August 27, 1914. Serial No. 858,393.

*To all whom it may concern:*

Be it known that I, PETER G. JACOBSON, a citizen of the United States, residing at Chicago, in the county of Cook and State of Illinois, have invented a certain new and useful Improvement in Handle Structures, of which the following is a full, clear, concise, and exact description, reference being had to the accompanying drawings, forming a part of this specification.

My invention relates to handle structures and has for its object the provision of improved mechanism at the lower end of a handle whereby an object to be attached to the handle may readily be attached and separated from the handle.

My invention has been employed for attaching handles to sweepers, squeegees, etc., but is not to be limited to objects that are to be attached to handles by constructions embracing the invention.

At the end of the handle where it is attached there are provided two lugs, preferably formed upon a ferrule that receives a stick portion of the handle, a complemental element of the attaching device being received at one end between these lugs and at the other end being attached to a squeegee or other instrument. A bail is secured to the ferrule and is adapted to overlie the said complemental element of the attaching device and to engage the same at such a point that will enable the bail readily to lock the parts in position. The locking action of the bail is desirably reinforced by forming the part thereof that engages said complemental element into a spring that presses said complemental element toward the handle stick. The lower end of the ferrule carries a loop or slotted element which coöperates with the aforesaid lugs in holding the aforesaid complemental element of the attaching device in a fixed plane with respect to the balance of the handle structure. This loop has structural characteristics which are of advantage.

I will explain my invention more fully by reference to the accompanying drawing showing the preferred embodiment thereof and in which—

Figure 1 is a side view showing a handle in supporting relation with a squeegee, the squeegee being shown in section; Fig. 2 is a sectional view on line 2 2 of Fig. 1; Fig. 3 is a bottom view of the structure as it appears in Figs. 1 and 2; Fig. 4 is a sectional view on line 4 4 of Fig. 1; Fig. 5 is a sectional view on line 5 5 of Fig. 3 showing, however, but a part of the structure that appears in Fig. 3; and Figs. 6 and 7 are perspective views illustrating details of construction.

Like parts are indicated by similar characters of reference throughout the different figures.

The handle stick 1, preferably of wood, is received at its lower end within a ferrule 2 which fixedly carries upon its outer end a plate or projection 3 having a loop opening or slot 4 which is elongated laterally of the ferrule. The ferrule carries lugs 5 and 6 at its upper end, these lugs being separated longitudinally of the ferrule to receive the bight of a U-shaped member 7 which is secured at its ends by means of screws 8 to a squeegee 9 or other object which is to be fastened to the handle stick. The inner lug 5 has a semi-circular curve so as to fit the inner curvature of the loop 7 at the bight of the loop 7, though the outer lug 6 need not be curved. A bail 10 is pivoted at diametrically opposite points upon the ferrule 2 near the upper end of the ferrule, the pivotal axis of the bail lying in a plane passing between the lugs 5 and 6. The bail carries a spring portion preferably in the form of a spring tongue 11, this tongue having spring engagement with the bight portion of the loop 7 when the bail is pressed forwardly, as indicated clearly in Fig. 5. The loop space 4 in the plate 3 is of a width which equals the thickness of the rod out of which the loop 7 is formed whereby the plate 3 is adapted to coöperate with the lugs 5 and 6 and the bail 10 to hold the loop element 7 in fixed relation with the ferrule 2 and the handle stick 1.

In assembling the parts the outer end of the bail is swung away from the ferrule whereafter the loop element 7 is passed through the loop space 4 into the position indicated most clearly in Fig. 5 whereafter the bail 10 is adjusted to the position indicated in Fig. 5, in which position the spring portion 11 presses the bight portion of the loop 7 firmly toward the handle stick 1. The plate 3 has a flanged continuation $3^1$ in which segmental recesses $3^2$, concentric with the ferrule 2, are formed, these segmental recesses $3^2$ receiving tongues $2^1$ formed upon the ferrule 2. The plate 3 and its continuation $3^1$ are mounted in position by causing the tongues $2^1$ to enter the segmental recesses or slots $3^2$ whereafter the screw 12 is passed through the opening at the center of the portion 3¹ and is screwed into the handle stick 1 to maintain the ferrule 2 and the plate portion 3, 3¹ in fixed relation. The ferrule itself is maintained in fixed relation with the handle stick 1 by means of a screw 13 passing through slot 14 extending longitudinally of and through the ferrule. The screw 13 is not tightened until after the screw 12 has been tightened, the slot 14 permitting the ferrule to assume its proper position upon the handle stick and permitting the ferrule to adapt itself to differing tapers upon different sticks. The screw 13 also serves to prevent the ferrule from becoming turned upon the handle stick.

While I have herein shown and particularly described the preferred embodiment of my invention I do not wish to be limited to the precise details of construction shown as changes may readily be made without departing from the spirit of my invention.

Having thus described my invention I claim as new and desire to secure by Letters Patent the following:—

1. A handle structure including a loop member for application to the device to which a handle is to be supplied; a handle part complemental to the loop member and carrying a pair of lugs between which the bight portion of said loop member may be received and also carrying a projection provided with a loop opening through which a portion of the loop may be passed to enable its bight portion to be interposed between said lugs; and a holding device for engaging said loop to hold its bight portion in position between said lugs.

2. A handle structure including a loop member for application to the device to which a handle is to be supplied; a handle part complemental to the loop member and carrying a pair of lugs between which the bight portion of said loop member may be received and also carrying a projection provided with a loop opening through which a portion of the loop may be passed to enable its bight portion to be interposed between said lugs; and a bail mounted upon the part of the handle structure carrying the lugs and having a portion adapted to be engaged with the loop member to hold the bight portion of the loop member in position between the lugs.

3. A handle structure including a loop member for application to the device to which a handle is to be supplied; a handle part complemental to the loop member and carrying a pair of lugs between which the bight portion of said loop member may be received and also carrying a projection provided with a loop opening through which a portion of the loop may be passed to enable its bight portion to be interposed between said lugs; and a bail mounted upon the part of the handle structure carrying the lugs and having a portion adapted to be engaged with the loop member to hold the bight portion of the loop member in position between the lugs, said bail carrying a spring portion, which is a part thereof, that engages the bight portion of the loop member.

4. A handle structure including a loop member for application to the device to which a handle is to be supplied; a handle part complemental to the loop member and carrying a pair of lugs between which the bight portion of said loop member may be received and also carrying a projection provided with a loop opening through which a portion of the loop may be passed to enable its bight portion to be interposed between said lugs; and a spring holding device mounted upon the part carrying the lugs and adapted to be engaged with the loop member to hold it in position between the lugs.

In witness whereof, I hereunto subscribe my name this twenty-third day of September A. D., 1913.

PETER G. JACOBSON.

Witnesses:
G. L. CRAGG,
ETTA L. WHITE.

Copies of this patent may be obtained for five cents each, by addressing the "Commissioner of Patents, Washington, D. C."